United States Patent [19]

Mueller et al.

[11] Patent Number: 5,329,903
[45] Date of Patent: Jul. 19, 1994

[54] PIVOTABLE JOINT

[75] Inventors: Manfred Mueller, Freiberg; Manfred Winter, Oedheim, both of Fed. Rep. of Germany

[73] Assignee: Filterwerk Mann & Hummel GmbH, Ludwigsburg, Fed. Rep. of Germany

[21] Appl. No.: 967,040

[22] Filed: Oct. 27, 1992

[30] Foreign Application Priority Data

Nov. 5, 1991 [DE] Fed. Rep. of Germany ... 9113727[U]

[51] Int. Cl.5 .......................... F02D 9/08; F16K 51/00
[52] U.S. Cl. .................................. 123/337; 137/315; 403/120; 251/305
[58] Field of Search ............... 403/120, 119, 113, 52, 403/65; 123/52 M, 52 MC, 337; 137/315; 251/305

[56] References Cited

U.S. PATENT DOCUMENTS

| | | | |
|---|---|---|---|
| 2,226,936 | 12/1940 | Markey | 403/305 |
| 2,370,584 | 2/1945 | Schneider | 403/119 |
| 2,701,114 | 2/1955 | Donaldson | 403/52 |
| 3,285,464 | 5/1965 | Boydman | 220/31 |
| 3,442,489 | 5/1969 | Cary | 251/305 |
| 3,677,297 | 7/1972 | Walton | 251/305 |
| 4,105,003 | 8/1978 | Funk | 123/590 |
| 4,474,009 | 10/1984 | Fried | 123/559.1 |

FOREIGN PATENT DOCUMENTS 1559828 3/1970 Fed. Rep. of Germany .
993636 6/1965 United Kingdom .

Primary Examiner—P. Austin Bradley
Assistant Examiner—Rex E. Pelto
Attorney, Agent, or Firm—Evenson, McKeown, Edwards & Lenahan

[57] ABSTRACT

A pivotable joint including a first part provided with pivot bores and a second part with resiliently mounted pivot pins received in said pivot bores such that the second part is pivotably mounted in a desired assembled position. The first part has a closed tubular cross section and may be a section of the intake manifold of an internal combustion engine. The resiliently mounted pivot pins are symmetrically mounted on opposite sides of the second part, which may be a throttle valve. The pivot pins are elastically displaceable axially during assembly of the first and second parts such that they snap resiliently into the pivot bores of the first part when the second part reaches the desired assembled position.

7 Claims, 3 Drawing Sheets

PIVOTABLE JOINT

BACKGROUND OF THE INVENTION

This invention relates to a pivotable joint in which a first part is provided with pivot bores and a second part with elastic mounting pins or pivot pins.

Pivotable joints of this general type are known, e.g., in boxes for music cassettes. However, if it is desired to use such pivotable joints, for example, in intake manifolds with throttle valves, it is disadvantageous that the passage cross section would have to be made elastic. This would certainly be difficult and expensive. A housing could also be provided which could be divided and then reassembled in order to mount the throttle valve. This is, however, costly to manufacture, and it would make the pivotable joint expensive. Another possibility would be to mount the throttle valve on a continuous shaft extended through pivot bores. This, however, would be difficult to assemble and would make it necessary afterward to seal up the intake manifold.

SUMMARY OF THE INVENTION

It is therefore the object of the invention to improve a pivotable joint of the kind described above by providing a pivotable joint which is simple, inexpensive and easy-to-assemble and disassemble.

These and other objects of the invention are achieved by providing a pivotable joint comprising a first part with pivot bores and a second part with pivot pins inserted in the pivot bores of the first part, in which the first part with the pivot bores has an unbroken tubular cross section, the second part has resiliently mounted pivot pins which during assembly deform or shift from their original positions, and when the second part reaches the desired assembled position relative to the first part, the elastic pivot pins snap resiliently into the pivot bores of the first part.

In a particularly preferred embodiment of the invention, the first part comprises a section of an intake manifold of an internal combustion engine and the second part is a throttle valve disposed in the intake manifold.

When the pivot pins snap into place, they reassume their original positions, and with the aid of the overall stability of the second part they resist accidental dislodging. On the other hand, this "locking up" due to the inherent elasticity of the material—plastic, for example—is so pliant that, by applying pressure in the right direction against the pivot mounting, the second part can be removed and reinstalled as often as desired.

Further advantageous features of preferred embodiments of the invention will appear from a consideration of the following detailed description of preferred embodiments.

BRIEF DESCRIPTION OF THE DRAWINGS

The invention will be described in further detail hereinafter with reference to an illustrative preferred embodiment shown in the accompanying drawings in which.

DETAILED DESCRIPTION OF PREFERRED EMBODIMENTS

Figure 1:
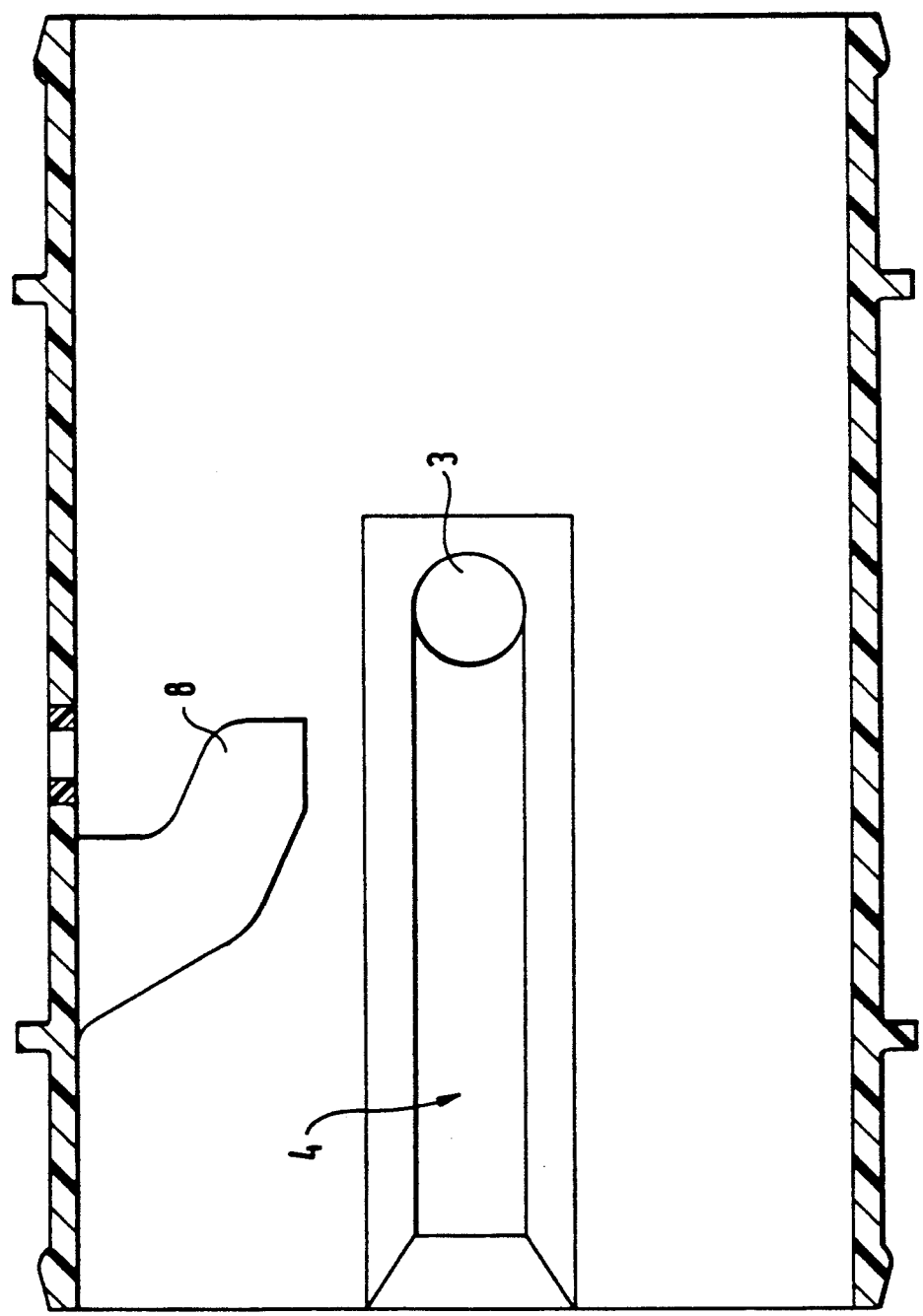
FIG. 1 is a sectional view through the first part of the pivotable joint.

The pivotable joint of the invention comprises a first part 1 and a second part 2, which are made of plastic. The first part 1 is provided with pivot bores 3 on opposite sides, only one of which is shown in the drawing. Assembly grooves or guide grooves 4 which lead to the pivot bores 3 are provided in first part 1 to facilitate assembly of the parts.

Figure 2:
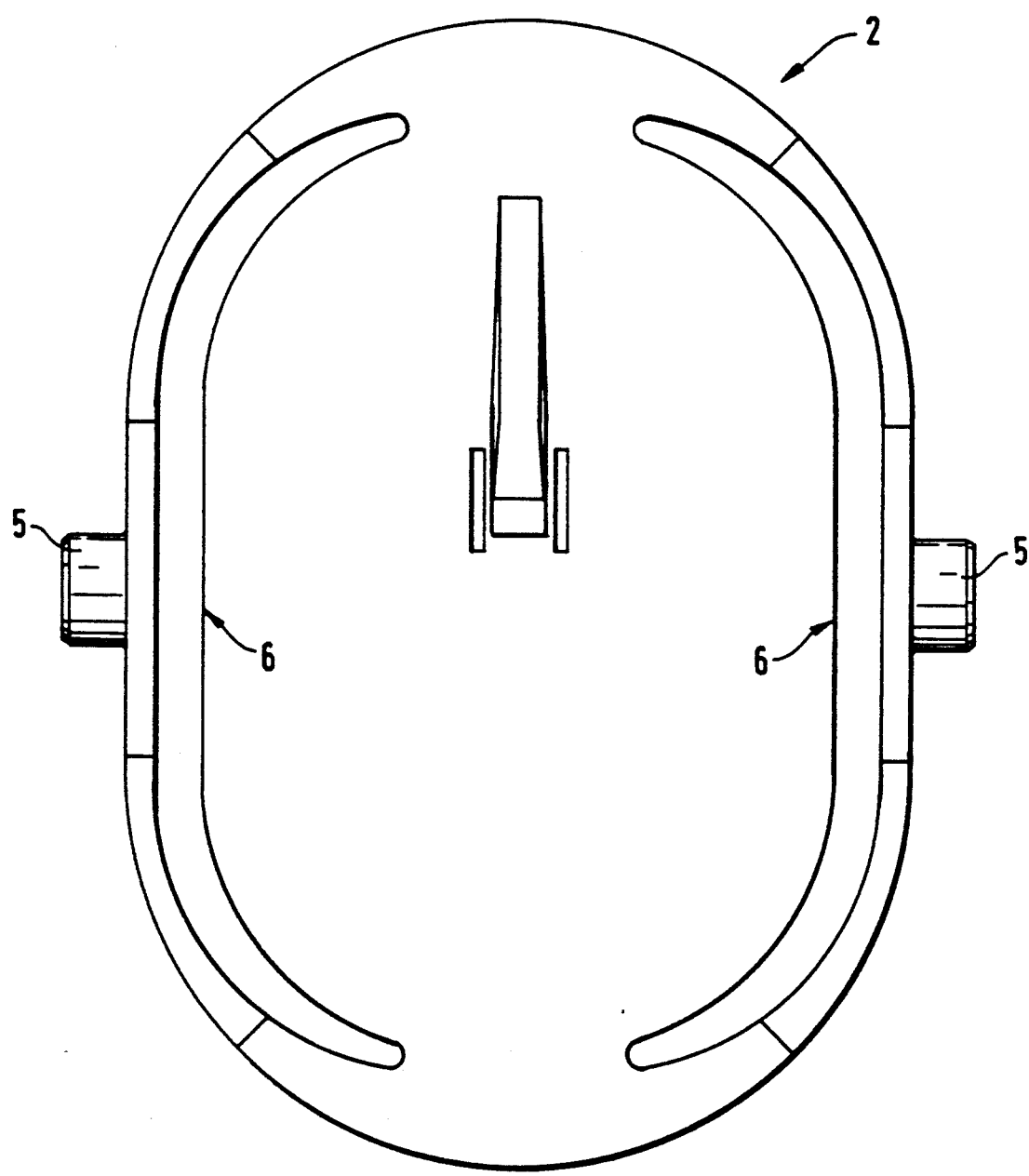
FIG. 2 is a top view of the second part of the pivotable joint.
Figure 3:
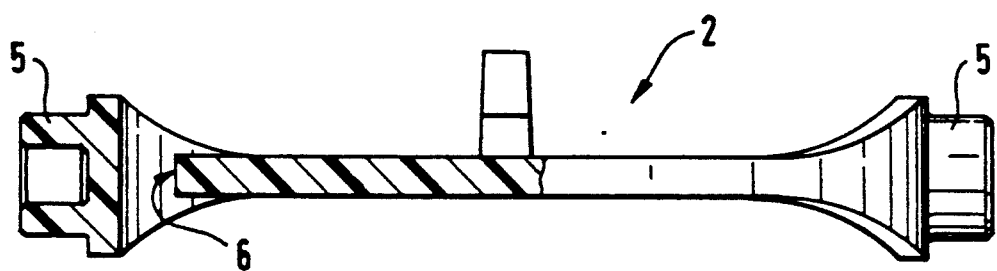
FIG. 3 is a transverse sectional view through the second part of the pivotable joint.
Figure 4:
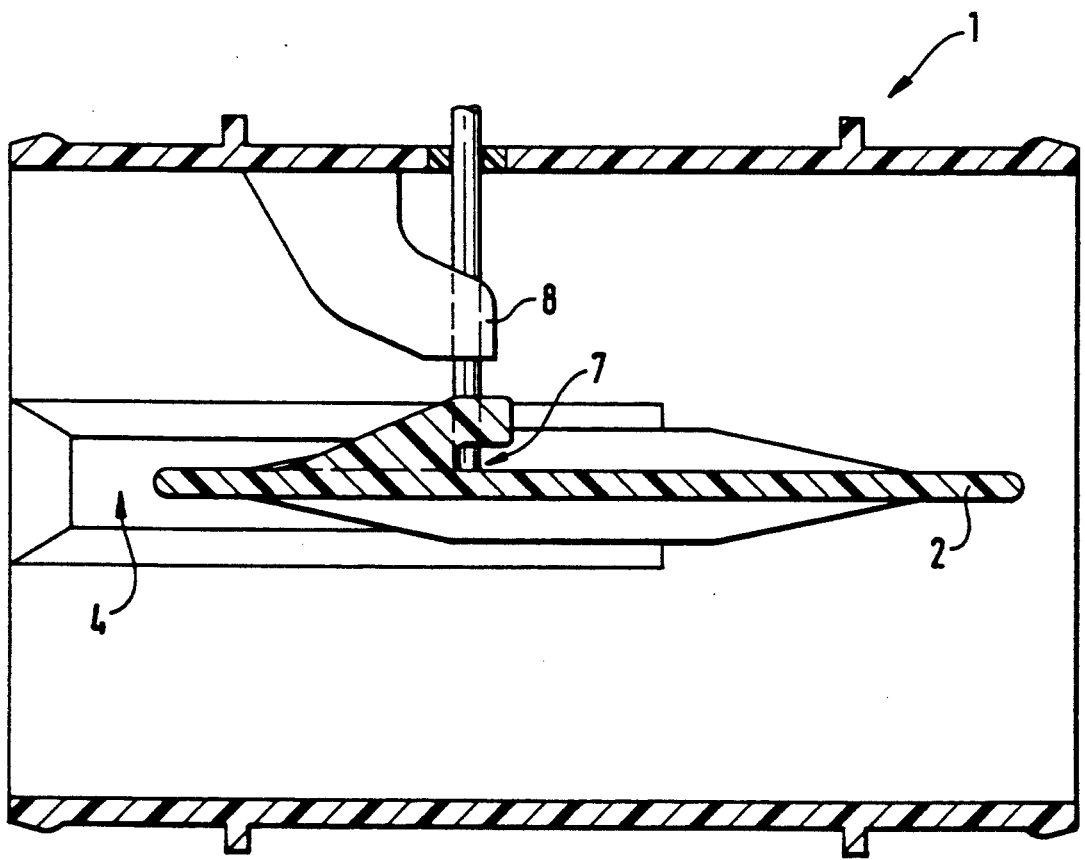
FIG. 4 is a longitudinal sectional view through the assembled pivotable joint.

The second part 2 is provided with elastic pivots 5. As can be seen most clearly in FIG. 2, second part 2 comprises a generally flat central portion and resilient arms attached to the ends of the central portion so that they extend along opposite sides of the second part. The pivot pins 5 are symmetrically mounted on these arms on opposite sides of the second part 2. Due to the construction of the illustrated embodiment, the pivot pins are displaceable essentially only in the axial direction. The axial deformation or displacement of elastic pivot pins 5 is limited by abutments 6 provided for that purpose. Thus the elastic pivots 5 are protected against overstress and destruction.

The second part 2 also is provided with a mounting member 7 for a control linkage by means of which the second part can be caused to pivot in order to assume desired positions in operation. In the illustrated preferred embodiment, a throttle valve abutment 8 is provided on the first part 1 to limit the pivoting of second part 2, and thereby prevent complete closure of the throttle valve.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. In an intake manifold of an engine, a pivotable joint, comprising:
    a first part provided with pivot bores, and
    a second part with resiliently mounted pivot pins received in said pivot bores such that said second part is pivotably mounted in a desired assembled position relative to said first part,
    wherein said first part has a closed tubular cross section, and
    wherein said pivot pins of said second part are elastically displaceable during assembly of said first and second parts and snap resiliently into the pivot bores of said first part when said second part reaches said desired assembled position;
    wherein said first part comprises a section of said intake manifold of an internal combustion engine, and said second part is a throttle valve disposed in said intake manifold.

2. A pivotable joint according to claim 1, wherein stop means are provided on said second part for limiting the resilient displacement of said pivot pins.

3. A pivotable joint according to claim 1, wherein assembly grooves are provided on said first part for guiding said resiliently mounted pivot pins of said second part to said pivot bores of said first part during assembly of said first and second parts.

4. A pivotable joint according to claim 1, further comprising a mounting member formed on said second part for connecting a control linkage for controlling pivoting of said second part relative to said first part.

5. A pivotable joint according to claim 1, wherein said elastic pivots are attached to opposite sides of said second part.

6. A pivotable joint according to claim 5, wherein said elastic pivots are symmetrically attached to opposite sides of said second part.

7. A pivotable joint according to claim 1, wherein said elastic pivots of said second part are deformable only in the axial direction.

* * * * *